(12) United States Patent
Fujieda et al.

(10) Patent No.: US 11,209,809 B2
(45) Date of Patent: Dec. 28, 2021

(54) DATA REPRODUCTION DEVICE FOR INDUSTRIAL PLANT

(71) Applicant: TOSHIBA MITSUBISHI-ELECTRIC INDUSTRIAL SYSTEMS CORPORATION, Chuo-ku (JP)

(72) Inventors: Hiroyuki Fujieda, Tokyo (JP); Katsuhiro Konishi, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 66 days.

(21) Appl. No.: 16/612,071

(22) PCT Filed: Aug. 4, 2017

(86) PCT No.: PCT/JP2017/028462
§ 371 (c)(1),
(2) Date: Nov. 8, 2019

(87) PCT Pub. No.: WO2019/026288
PCT Pub. Date: Feb. 7, 2019

(65) Prior Publication Data
US 2020/0159202 A1   May 21, 2020

(51) Int. Cl.
*G05B 19/41* (2006.01)
*G05B 23/02* (2006.01)
*G05B 19/418* (2006.01)

(52) U.S. Cl.
CPC ..... *G05B 23/0264* (2013.01); *G05B 19/4183* (2013.01); *G05B 19/41875* (2013.01); *G05B 23/0216* (2013.01)

(58) Field of Classification Search
CPC ............ G05B 23/0264; G05B 19/4183; G05B 19/41875; G05B 23/0216;
(Continued)

(56) References Cited

U.S. PATENT DOCUMENTS 7,509,238 B1 *  3/2009  Dumler ............... G06Q 10/06
                                                    702/188
7,565,610 B2 *  7/2009  Li ........................ H04L 41/22
                                                    709/223
(Continued)

FOREIGN PATENT DOCUMENTS

CN      101939766 A    1/2011
CN      104317923 A    1/2015
(Continued)

OTHER PUBLICATIONS

Zolotová, Iveta, and Rastislav Hošák. "Objects for visualization of process data in supervisory control." Aspects of Computational Intelligence: Theory and Applications. Springer, Berlin, Heidelberg, 2013. 51-61. (Year: 2013).*
(Continued)

*Primary Examiner* — Michael D Masinick
(74) *Attorney, Agent, or Firm* — Xsensus LLP

(57) ABSTRACT

A first graph display processing unit displays, on a first graph, a temporal variation of first process data accumulated in a process data storage unit. A second graph display processing unit displays, on a second graph, a temporal variation of second process data accumulated in the process data storage unit, and moves a time range of the data displayed on the second graph in accordance with a change of the time pointed to by a second time cursor on the second graph. A time coordination unit stores the time Ta pointed to by a first time cursor and changes the time pointed to by the second time cursor to time Ta, and thereby causes second process data of the same time as that of the first process data displayed on the first graph to be displayed on the second graph.

7 Claims, 16 Drawing Sheets

(58) Field of Classification Search
CPC .......... G05B 2219/32404; G05B 2219/31469; G05B 23/0267; G05B 19/058; Y02P 90/02

See application file for complete search history.

(56) References Cited

U.S. PATENT DOCUMENTS

| | | | | |
|---|---|---|---|---|
| 8,754,889 B2* | 6/2014 | Haub | ............... | G06F 3/04812 345/440 |
| 2005/0219151 A1* | 10/2005 | Li | ............... | H04L 41/5035 345/7 |
| 2010/0238174 A1* | 9/2010 | Haub | ............... | G06F 3/04812 345/440 |
| 2011/0074597 A1* | 3/2011 | Koshiishi | ............... | G05B 23/0267 340/691.3 |
| 2012/0041576 A1* | 2/2012 | Mikkelsen | ............... | G05B 19/409 700/80 |
| 2016/0054718 A1* | 2/2016 | Nakagawa | ............... | G05B 19/4183 340/3.3 |
| 2018/0088541 A1* | 3/2018 | Sangi | ............... | H04L 67/42 |

FOREIGN PATENT DOCUMENTS

| | | |
|---|---|---|
| JP | 2010-173253 A | 8/2010 |
| JP | 2013-149151 A | 8/2013 |
| JP | 2016-115195 A | 6/2016 |
| WO | WO 2014/002176 A1 | 1/2014 |

OTHER PUBLICATIONS

International Search Report dated Oct. 24, 2017 in PCT/JP2017/028462 filed Aug. 4, 2017.

Taiwanese Office Action dated Sept. 7, 2018 in corresponding Taiwanese Patent Application No. 106132079 (with partial English language translation), 15 Pages.

Indian Office Action dated May 27, 2021, in corresponding Indian Patent Application No. 201917053568.

* cited by examiner

| GRAPH NAME | PROCESS DATA NAME |
|---|---|
| a | A, C |
| b | B, D |
| c | A, E |
| d | A, F |

FIG. 5

| GRAPH NAME | PROCESS DATA NAME |
|---|---|
| a | A, C |
| c | A, E |
| d | A, F |

FIG. 8

DATA REPRODUCTION DEVICE FOR INDUSTRIAL PLANT

FIELD

The present invention relates to a data reproduction device for an industrial plant.

BACKGROUND

Industrial plants (steel plants, power plants, petroleum plants, chemical plants, etc.) that produce materials and resources necessary for industrial activities are known. A plant monitoring control system of an industrial plant includes a configuration in which, via a control network, an input/output device (I/O) that is connected to numerous field devices constituting the plant (including actuators and sensors) and a programmable logic controller (hereinafter referred to as PLC) that controls the numerous field devices are interconnected. The PLC inputs feedback signals from the field device via the control network and the input/output device, and outputs control signals for controlling the field devices.

The input and output signals of the PLC and the input/output device are called process data. In a large-scale plant such as a steel plant, several thousands of or several tens of thousands of input/output points exist, and various pieces of process data exist. These pieces of process data are collected by a data reproduction device having a data collection function and a data reproduction function, and used in data analysis at the time of testing, adjustment, and failure.

A data reproduction device of a conventional plant monitoring control system (for example, see PTL 1) connects to a control network, and collects pieces of process data that have temporal variations on the control network. The collected pieces of process data are displayed on a graph, and it is possible to grasp the state of the industrial plant.

CITATION LIST

Patent Literature

[PTL 1] WO 2014/002176

SUMMARY

Technical Problem

In a plant monitoring control system that includes numerous devices, in order to grasp the state of the industrial plant, it is required to be able to confirm numerous pieces of process data on a graph. However, if numerous pieces of process data are displayed on one single graph, the display range per one piece of process data becomes narrow, making it difficult to grasp the state of the industrial plant.

As a result, the number of pieces of process data to be displayed on one graph is often set small, and multiple graphs are displayed to confirm the necessary process data. Since multiple devices operate in coordination in a plant monitoring control system, it is necessary to bring the times of the multiple graphs into agreement and grasp the state of the industrial plant. However, in a conventional data reproduction device, the times of the graphs are manually brought into agreement, and graph screen is moved while the times are manually kept in agreement. In this manner, since the data reproduction device is utilized while the times of the graphs are manually placed in coordination for grasping the states of the multiple devices, much labor and time have been necessitated.

An object the present invention, which has been made to solve the above-described problem, is to provide a data reproduction device for an industrial plant capable of automatically bringing the times of the graphs into agreement for grasping the states of the multiple devices and reducing the labor and time to grasp the state of the industrial plant.

Solution to Problem

In order to achieve the above-described object, a data reproduction device for an industrial plant is configured in the following manner. The data reproduction device for the industrial plant is connected, via a control network, to an input/output device that connects to devices constituting the industrial plant and to a programmable logic controller that controls the devices.

The data reproduction device for the industrial plant includes a process data acquisition unit, a process data storage unit, a first graph display processing unit, a second graph display processing unit, a time coordination unit, and a data reproduction processing unit.

The process data acquisition unit acquires various pieces of process data output to the control network from the programmable logic controller and the input/output device. The process data storage unit accumulates the various pieces of process data at each time.

The first graph display processing unit displays, on a first graph, a temporal variation of first process data accumulated in the process data storage unit, and moves a time range of data displayed on the first graph in accordance with a change of time pointed to by a first time cursor on the first graph.

The second graph display processing unit displays, on a second graph, a temporal variation of second process data accumulated in the process data storage unit, and moves a time range of data displayed on the second graph in accordance with a change of time pointed to by a second time cursor on the second graph.

The time coordination unit stores a time Ta pointed to by the first time cursor, outputs the time Ta to the second graph display processing unit, changes a time pointed to by the second time cursor to the time Ta, and thereby causes the second process data of the same time as that of the first process data displayed on the first graph to be displayed on the second graph.

The data reproduction processing unit is capable of reproducing the respective pieces of process data displayed on the first graph and the second graph in a coordinated manner.

Advantageous Effects of Invention

According to the data reproduction device for the industrial plant in accordance with this embodiment, it is possible to automatically bring the time ranges of the respective pieces of process data displayed on the first graph and the second graph into agreement. As a result, in the course of utilization of the data reproduction device, there is no need for complicated operations to manually match the reproduction start times of the respective pieces of data manually, and the labor and time to grasp the state of the industrial plant can be reduced.

BRIEF DESCRIPTION OF DRAWINGS

FIG. 5 is a diagram illustrating an example of a graph definition file.

FIG. 8 is a diagram illustrating an example of a list which a selected process data coordination graph display unit displays.

DESCRIPTION OF EMBODIMENTS

Hereinafter, embodiments of the present invention will be described in detail with reference to the drawings. It should be noted that common elements throughout the respective drawings are indicated by the same reference signs with redundant explanations thereof omitted.

First Embodiment (System Configuration)

Figure 1:
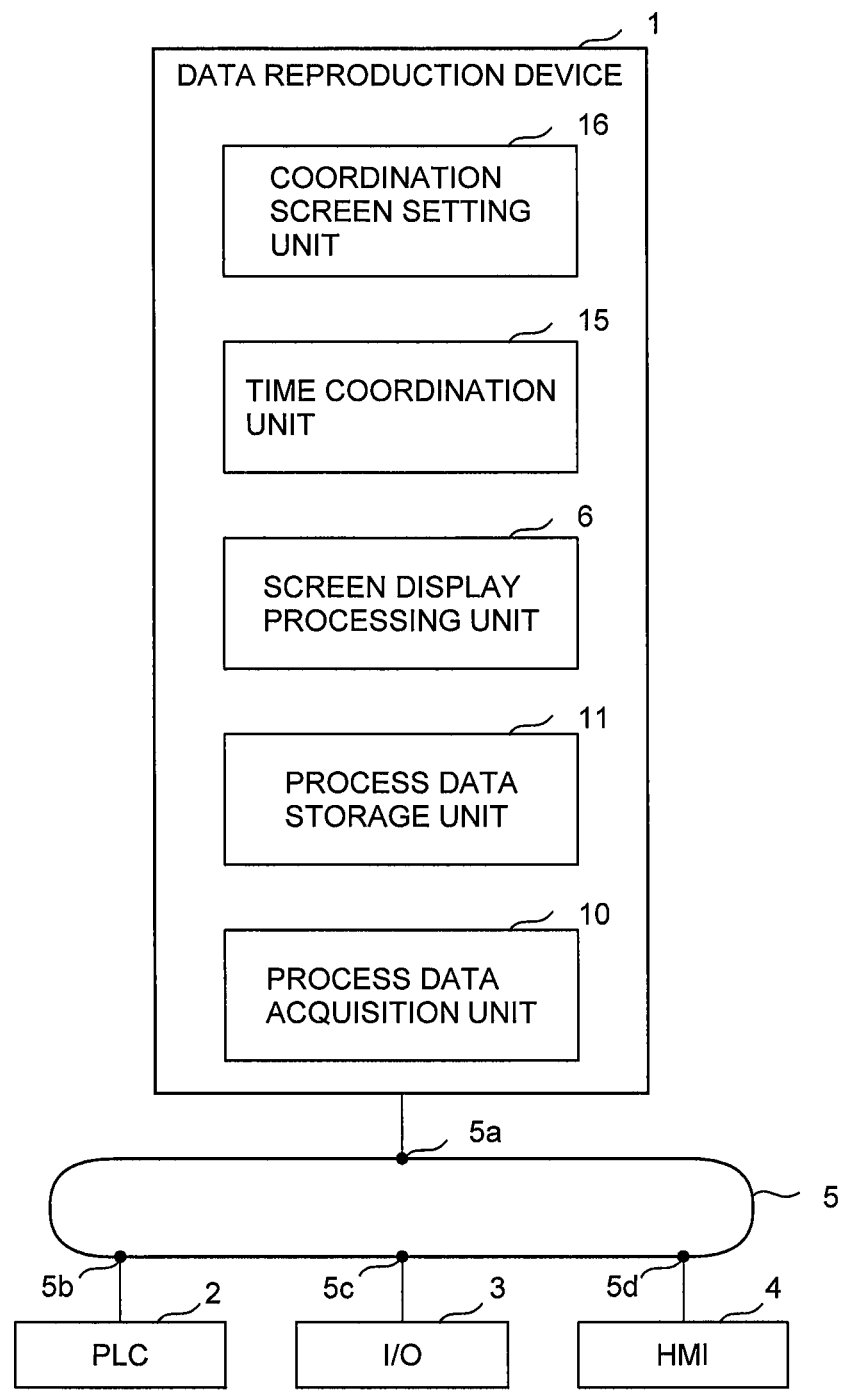
FIG. 1 is a schematic diagram illustrating a configuration of a plant monitoring control system of an industrial plant according to a first embodiment.

FIG. 1 is a schematic diagram illustrating a configuration of a plant monitoring control system of an industrial plant according to a first embodiment.

The data reproduction device 1 is connected, via a control network 5, to input/output device (I/O) 3 connected to devices (including actuators and sensors) constituting the industrial plant; a programmable logic controller (PLC) 2 that controls these devices; and a human machine interface (HMI) 4, which is a monitor control device used by an operator for full-time operation and monitoring of the industrial plant.

The control network 5 has a plurality of nodes that share common memory and synchronizes data on the common memory through periodic broadcast transmission between the multiple nodes. As a result of this, the same memory space is shared in a virtual manner among the data reproduction device 1 connected to a node A5a, the PLC 2 connected to a node B5b, the input/output device 3 connected to a node C5c, and the HMI 4 connected to a node D5d. Storage areas (addresses) of respective pieces of data are allocated in the common memory. The devices connected to the respective nodes can transmit and receive data by writing to and reading from the common memory.

The data reproduction device 1 includes a process data acquisition unit 10, a process data storage unit 11, a screen display processing unit 6, a time coordination unit 15, and a coordination screen setting unit 16.

(Example of Hardware Configuration)

Figure 2:
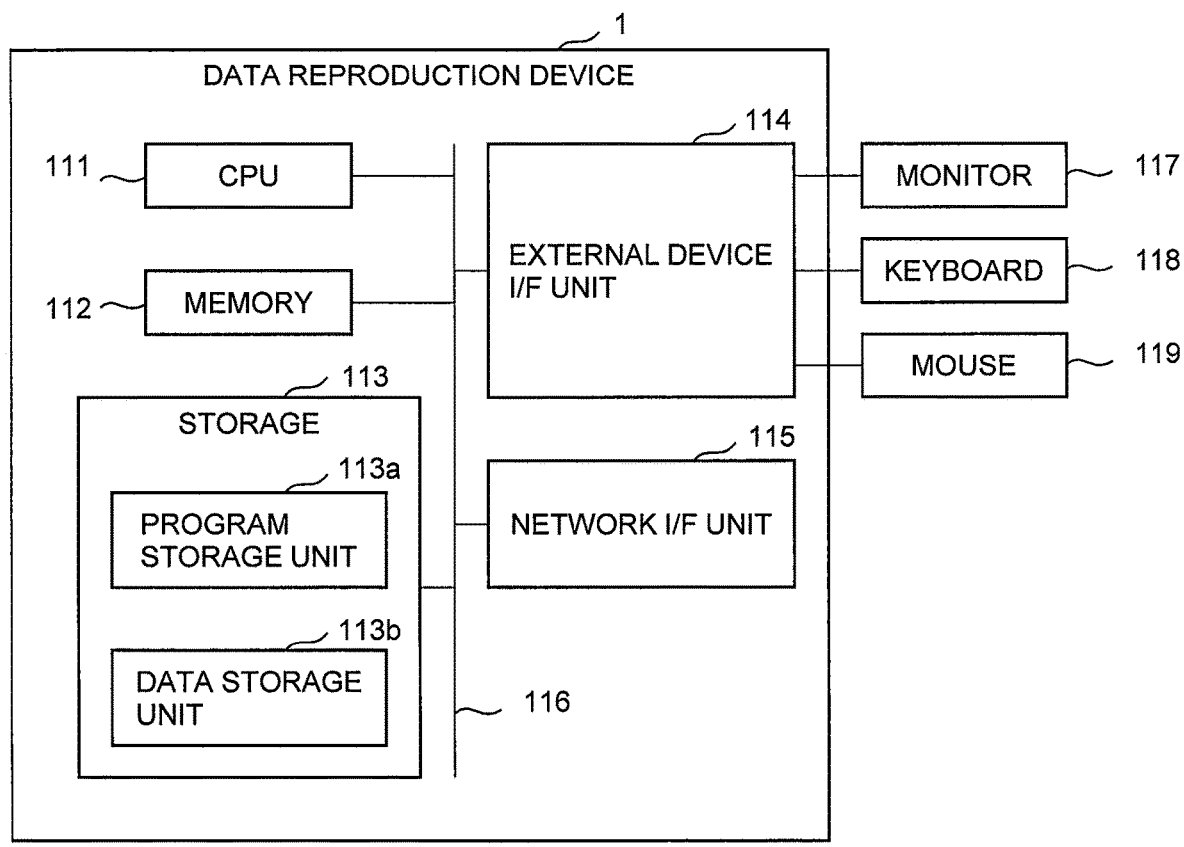
FIG. 2 is a block diagram illustrating an example of a hardware configuration of a processing circuit which a data reproduction device includes.

The hardware configuration of the data reproduction device 1 will be described with reference to FIG. 2. FIG. 2 is a block diagram illustrating an example of the hardware configuration of a processing circuit which the data reproduction device 1 of FIG. 1 includes. The individual units of the data reproduction device 1 illustrated in FIG. 1 indicate part of the functions which the data reproduction device 1 includes, and the individual functions are effectuated by the processing circuit. For example, the processing circuit is configured by interconnection, via an internal bus 116, of a CPU 111, a memory unit 112, a storage unit 113 such as an HDD, large capacity memory, etc., an external device interface (I/F) unit 114, and a network I/F unit 115.

The CPU 111 effectuates the functions of the process data acquisition unit 10 and the process data storage unit 11 of FIG. 1 by executing data collection program from among the various application programs stored in the program storage unit 113a of the storage unit 113. Also, by executing a data reproduction program, it effectuates the functions of the screen display processing unit 6, the time coordination unit 15, and the coordination screen setting unit 16 of FIG. 1.

The memory unit 112 is used as an operation area for temporarily storing and deploying data when the CPU 111 executes various application programs.

The storage unit 113 has a program storage unit 113a and a data storage unit 113b. The program storage unit 113a stores an operating system (OS) as well as the above-described data collection program and data reproduction program. Also, the data storage unit 113b stores various pieces of process data collected by the data collection program. Also, the data storage unit 113b stores setting data in the screen display processing unit 6, the time coordination unit 15, and the coordination screen setting unit 16.

It should be noted that, in the example illustrated in FIG. 2, the program storage unit 113a and the data storage unit 113b are provided in one single storage unit 113 but the program storage unit 113a and the data storage unit 113b may be arranged separately on multiple storage units.

The external device I/F unit 114 is an interface for interconnecting external devices such as a monitor 117, a keyboard 118, a mouse 119, etc., and the data reproduction device 1. The network I/F unit 115 is an interface for interconnecting the control network 5 and the data reproduction device 1.

(Data Reproduction Device)

The input and output signals of the PLC 2 and the input/output device 3 are called "process data." The input and output signals comprise a control signal for controlling an actuator and an output signal that is output by a sensor. In a large-scale plant such as a steel plant, several thousands of or several tens of thousands of input and output points exist, and various pieces of process data exist. These pieces of process data are collected by the data reproduction device 1 that has a data collection function and a data reproduction function, and used in data analysis at the time of testing, adjustment, and failure.

Figure 3:
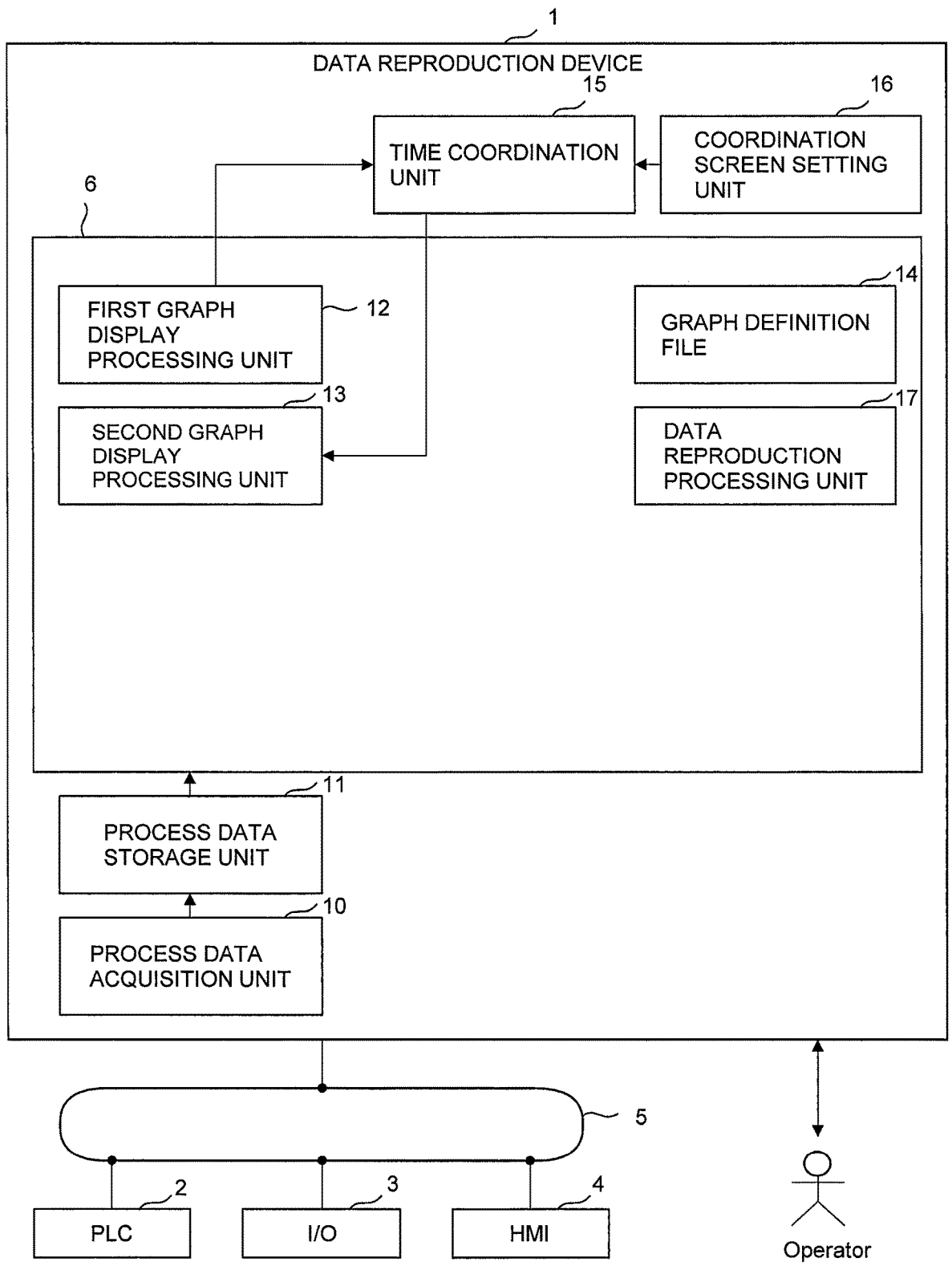
FIG. 3 is a functional block diagram of a data reproduction device according to the first embodiment.

FIG. 3 is a functional block diagram of the data reproduction device 1 according to the first embodiment. The data reproduction device 1 includes a process data acquisition unit 10, a process data storage unit 11, a screen display processing unit 6, a time coordination unit 15, and a coordination screen setting unit 16.

The process data acquisition unit 10 acquires various process data output from the PLC2 and the input/output device 3 to the control network 5, the various process data being acquired for each control period. Elements of the process data include data name, data acquisition time, and data value.

The process data storage unit 11 accumulates various process data at each time in the data storage unit 113b of the storage unit 113.

The screen display processing unit 6 includes a first graph display processing unit 12, a second graph display processing unit 13, a graph definition file 14, and a data reproduction processing unit 17.

Figure 4:
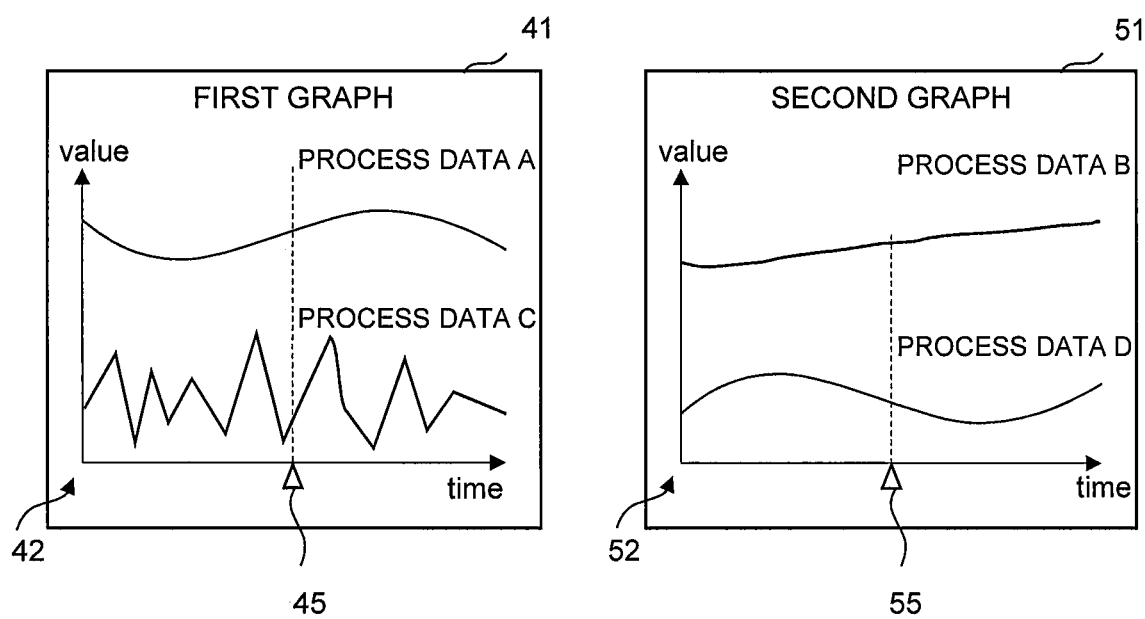
FIG. 4 is a diagram for explanation of a display example of a first window and a second window displayed on a monitor of the data reproduction device.

The first graph display processing unit 12 will be described with reference to FIG. 4. FIG. 4 is a diagram for explanation of a display example of a first window 41 and a second window 51 displayed on the monitor 117 of the data reproduction device 1.

The first graph display processing unit 12 displays a first window 41 on a monitor 117 in accordance with an operation of an operator. In the first window 41, a first graph 42 is displayed, where the horizontal axis indicates the time and the vertical axis indicates the data value.

The first graph display processing unit 12 displays, on the first graph 42, temporal variations of the pieces of process data accumulated in the process data storage unit 11. The pieces of process data displayed on the first graph 42 are defined in advance in the graph definition file 14. In the graph definition file 14, for each graph, a plurality of the pieces of process data to be displayed on one graph are defined. FIG. 5 is a diagram illustrating an example of the graph definition file 14 and, for example, it is defined that the piece of process data A and the piece of process data C are to be displayed on a graph a. In FIG. 4, the piece of process data A and the piece of process data C associated with the graph a as the first graph 42 are illustrated.

On the first graph 42, a process data name (the indications of "process data A" and "process data C" in FIG. 4) and a first time cursor 45 are indicated. On the first graph 42, the process data of a time range including predetermined periods preceding and following the first time cursor 45 as the center (for example, several minutes or several hours) is indicated. The first graph display processing unit 12 moves the time range of the data to be displayed on the first graph 42 in accordance with a change of the time pointed to by the first time cursor 45 on the first graph 42. For example, in a case where the display position of the first time cursor 45 on the first window 41 is fixed, when the operator drags and drops the display area of the first graph 42 in the time axis (horizontal axis) direction, the time pointed to by the first time cursor 45 changes.

The time pointed to by the first time cursor 45 of the first graph 42 is described as "time Ta." The first graph display processing unit 12 outputs the time Ta pointed to by the first time cursor 45 of the first graph 42 to the time coordination unit 15.

The second graph display processing unit 13 displays a second window 51 on the monitor 117 in accordance with an operation of the operator. In the second window 51, a second graph 52 is displayed, where the horizontal axis indicates the time and the vertical axis indicates the data value. As illustrated in FIG. 4, the first graph 42 and the second graph 52 are displayed in different windows, respectively.

The second graph display processing unit 13 displays, on the second graph 52, temporal variations of the process data accumulated in the process data storage unit 11. The pieces of process data displayed on the second graph 52 are defined in advance in the graph definition file 14. In FIG. 5, it is defined, for example, that the pieces of process data B and process data D are to be displayed on a graph b. In FIG. 4, as the second graph 52, the pieces of process data B and process data D associated with the graph b are displayed.

On the second graph 52, a process data name (the indications of "process data B" and "process data D" in FIG. 4) and a second time cursor 55 are displayed. On the second graph 52, the process data of a time range including predetermined periods preceding and following the second time cursor 55 as the center (for example, several minutes or several hours) is displayed. The second graph display processing unit 13 moves the time range of the data to be displayed on the second graph 52 in accordance with a change of the time pointed to by the second time cursor 55 on the second graph 52. For example, in a case where the display position of the second time cursor 55 on the second window 51 is fixed, when the operator drags and drops the display are of the second graph 52 in the time axis (horizontal axis) direction, the time pointed to by the second time cursor 55 changes.

Also, the second graph display processing unit 13, in a case where the time Ta is input from the time coordination unit 15, changes the time pointed to by the second time cursor 55 to the time Ta.

In the coordination screen setting unit 16, a graph to be in coordination is specified in advance. This setting can be specified by the operator. In this embodiment, it is assumed that the target with which the time of the graph a, which is the first graph 42, should be coordinated is the graph b, which is the second graph 52.

The time coordination unit 15 stores the time Ta pointed to by the first time cursor 45 and changes the time pointed to by the second time cursor 55 to the time Ta, and thereby displays, on the second graph 52, the process data (the pieces of process data B and D) of the same time as that of the process data (the pieces of process data A and C of FIG. 4) displayed on the first graph 42.

Specifically, the time coordination unit 15 inputs the time Ta from the first graph display processing unit 12, and stores it in the data storage unit 113b of the storage unit 113. In the coordination screen setting unit 16, coordination between the first graph 42 and the second graph 52 is specified, and the time coordination unit 15 outputs the time Ta to the second graph display processing unit 13 in accordance with a screen operation of the operator (for example, pressing of a coordination button). As a result of this, the time coordination unit 15 causes the second graph display processing unit 13 to change the time pointed to by the second time cursor 55 to the time Ta. As a result, the time range of the data displayed on the second graph 52 becomes the same time range as that of the first graph 42. On these two graphs, different pieces of process data at the same time (pieces of process data A to process data D) are displayed.

The data reproduction processing unit 17 is capable of reproducing each piece of process data displayed on the first graph 42 and the second graph 52 in a coordinated manner. Specifically, the data reproduction processing unit 17 defines the time Ta pointed to by the first time cursor 45 and the second time cursor 55 as a reproduction start time in accordance with a screen operation of the operator (for example, pressing of a reproduction button), and updates the time at issue at a predetermined reproduction speed. The first graph display processing unit 12 and the second graph display processing unit 13 move the time range of the data displayed on the first graph 42 and the second graph 52 in accordance with updating of the time.

(Flowchart)

Figure 6:
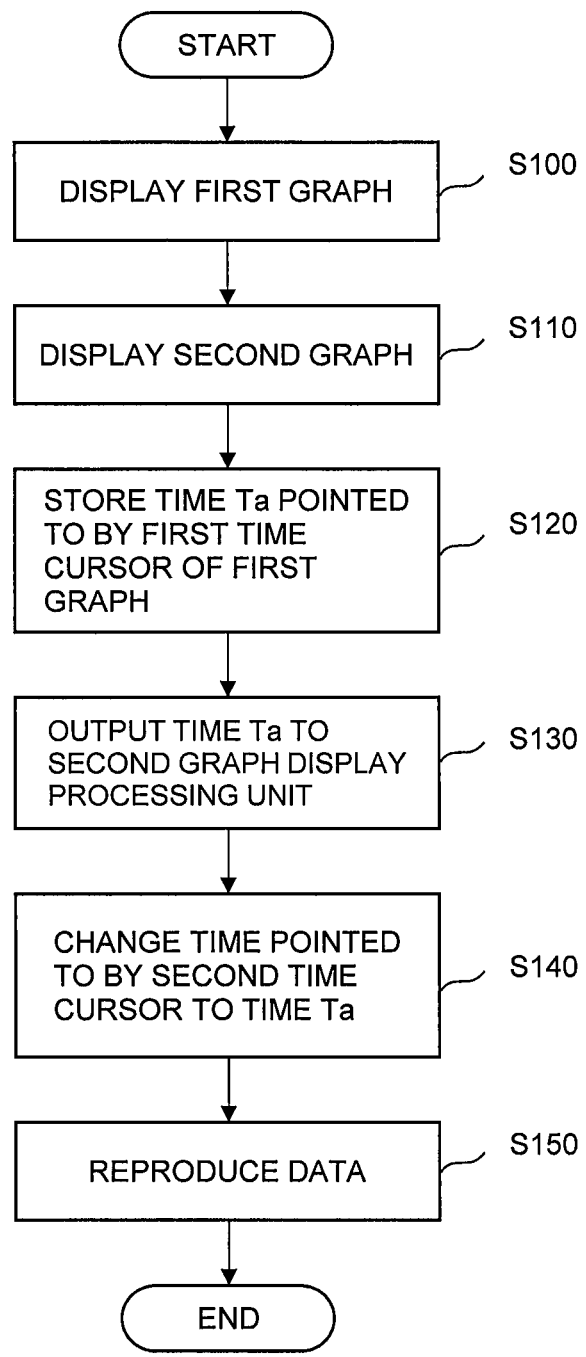
FIG. 6 is a flowchart of processing which the data reproduction device according to the first embodiment performs on the basis of a screen operation by an operator.

Next, the operation of the data reproduction device 1 will be described with reference to FIG. 6. FIG. 6 is a flowchart of processing which the data reproduction device 1 according to the first embodiment performs on the basis of a screen operation by an operator.

First, in the step S100, the data reproduction device 1 displays the first window 41 that includes the first graph 42 on the monitor 117 in accordance with a screen operation by the operator. Here, it is assumed that the graph a defined in the graph definition file 14 of FIG. 5 has been designated as the first graph 42. The first graph display processing unit 12 reads the pieces of process data A and C associated with the graph a defined in the graph definition file 14 from the process data storage unit 11 and displays them on the first graph 42 (FIG. 4).

Next, in the step S110, the data reproduction device 1 displays, on the monitor 117, the second window 51 including the second graph 52 in accordance with a screen operation by the operator. Here, it is assumed that the graph b defined in the graph definition file 14 of FIG. 5 has been designated as the second graph 52. The second graph display processing unit 13 reads, from the process data storage unit 11, the pieces of process data B and D associated with the graph b defined in the graph definition file 14 and displays them on the second graph 52 (FIG. 4).

Next, in the step S120, the time coordination unit 15 stores a time Ta pointed to by the first time cursor 45 of the first graph 42. For example, time pointed to by the first time cursor 45 is changed by a screen operation by the operator and the first graph display processing unit 12 outputs the time Ta pointed to by the first time cursor 45 to the time coordination unit 15. The time coordination unit 15 stores the time Ta.

Next, in the step S130, the time coordination unit 15 outputs the time Ta to the second graph display processing unit 13. Specifically, in the coordination screen setting unit 16, coordination between the first graph 42 and the second graph 52 is specified, and the time coordination unit 15 outputs the time Ta to the second graph display processing unit 13 in accordance with a screen operation of the operator (for example, pressing of a coordination button).

Next, in the step S140, the second graph display processing unit 13 changes the time pointed to by the second time cursor 55 of the second graph 52 to the time Ta. As a result of this, different pieces of process data of the same time (process data A to process data D) are displayed on the first graph 42 and the second graph 52.

Next, in the step S150, the data reproduction processing unit 17 simultaneously reproduces the pieces of process data of the same time displayed on the first graph 42 and the second graph 52 in accordance with a reproduction operation of the operator (for example, pressing of a reproduction button).

(Effect)

As has been described in the foregoing, in a plant monitoring control system in which multiple devices operate in a coordinated manner, it is necessary to recognize the state of the industrial plant by displaying the times of multiple graphs in a coordinated manner and, according to the data reproduction device 1 in accordance with the first embodiment, the times of the first graph 42 and the second graph 52 can be automatically brought into agreement. As a result, operations of the operators on the graphs on the data reproduction device 1 can be facilitated, and it is made possible to recognize the state of the industrial plant in a short time.

Second Embodiment

Figure 8:
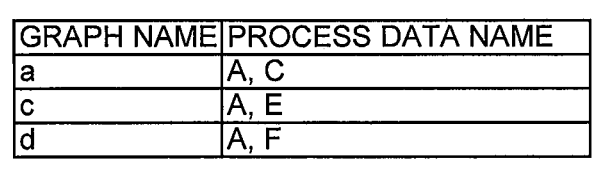
Figure 9:
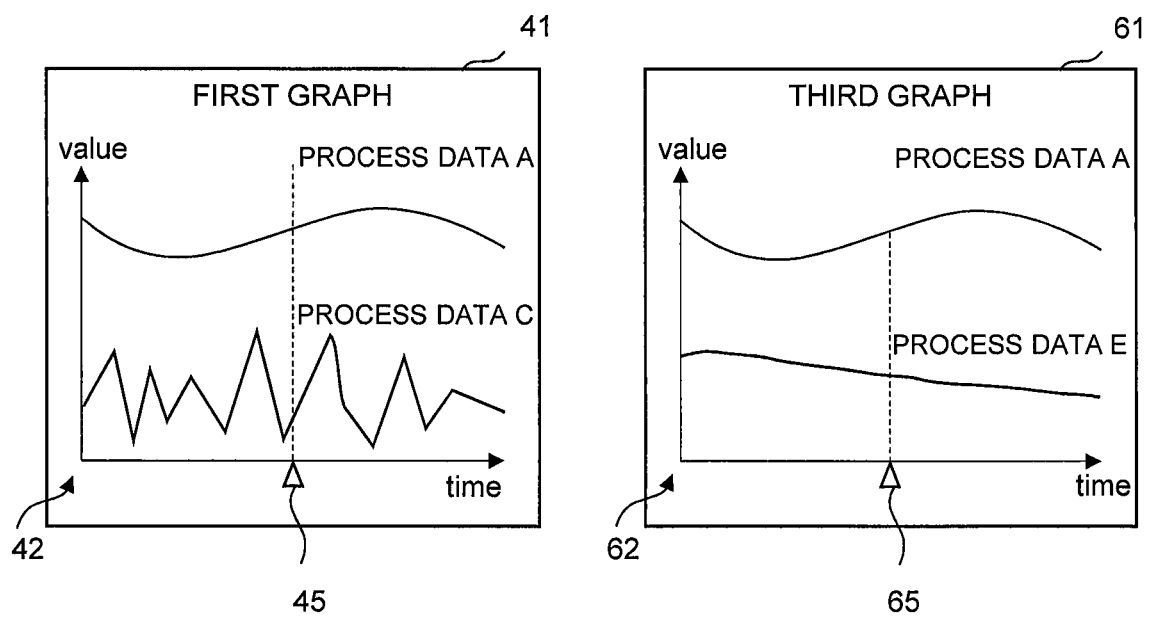
FIG. 9 is a diagram for explanation of a display example of a first window and a third window displayed on a monitor of the data reproduction device.

Next, the second embodiment will be described with reference to FIGS. 5 and 7 to 10. In the above-described first embodiment, display can be provided such that the time range of any appropriate process data to be displayed on the second graph 52 of FIG. 4 is brought into agreement with those of the other process data displayed on the first graph 42. In the second embodiment, a name of a particular piece of process data is selected from the first graph 42, and it is made possible to display a third graph 62 which includes the other process data associated with the particular process data in advance with the time range brought into agreement with the time range of the first graph 42 (FIG. 9).

(Data Reproduction Device)

Figure 7:
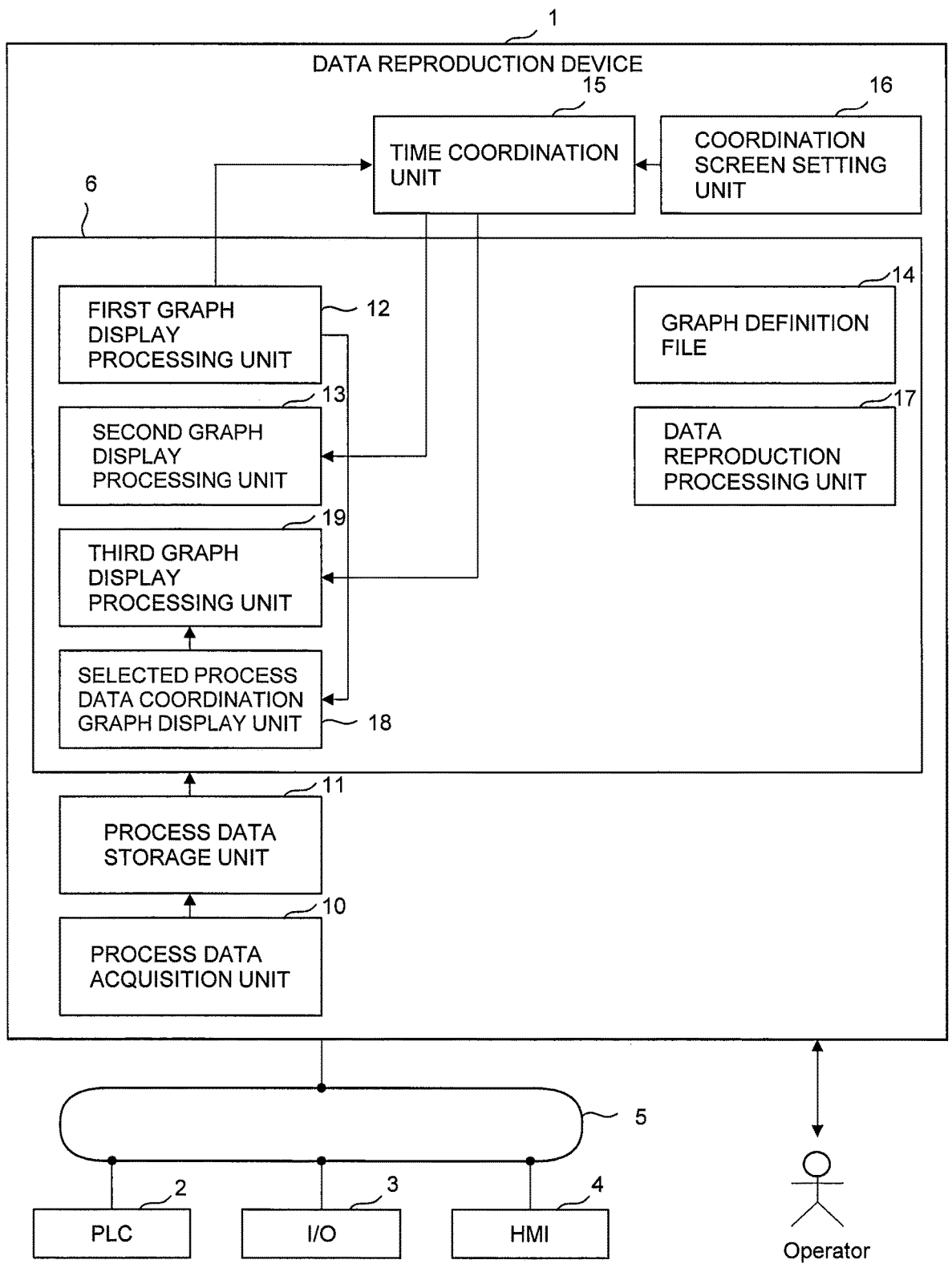
FIG. 7 is a functional block diagram of the data reproduction device according to the second embodiment.

FIG. 7 is a functional block diagram of the data reproduction device 1 according to the second embodiment. The configuration illustrated in FIG. 7 is identical with the above-described one illustrated in FIG. 3 except that a selected process data coordination graph display unit 18 and a third graph display processing unit 19 are additionally provided and that the processes performed by the first graph display processing unit 12, the time coordination unit 15, and the data reproduction processing unit 17 are extended.

The first graph display processing unit 12 includes the functions that have been described in the first embodiment. Further, the first graph display processing unit 12, in a case where a name of the first process data displayed on the first graph 42 is selected, outputs the name of the first process data to the selected process data coordination graph display unit 18. For example, in a case where the name of the process data A displayed on the first graph 42 of FIG. 9 is selected as the first process data, the first graph display processing unit 12 outputs the name of the process data A to the selected process data coordination graph display unit 18.

The selected process data coordination graph display unit 18, in a case where the name of the first process data displayed on the first graph 42 is selected, displays a list of graphs including the first process data on the basis of the graph definition file 14. FIG. 8 is a diagram illustrating an example of the list to be displayed by the selected process data coordination graph display unit 18. According to the graph definition file 14 illustrated in FIG. 5, in a case where a graph of the process data A has been designated as the first process data, the graphs that includes the process data A comprise the graph a, the graph c, and the graph d, and these graphs are displayed as listing thereof in the form of a list in a new window list.

The third graph display processing unit 19 will be described with reference to FIG. 9. FIG. 9 is a diagram for explanation of the display example of the first window and a third window displayed on the monitor 117 of the data reproduction device 1. The first window is the same as that in the above-described first embodiment and accordingly explanation thereof is omitted.

The third graph display processing unit 19 displays the third window 61 on the monitor 117 in accordance with an operation of the operator selecting a third graph 62 from the list illustrated in FIG. 8. On the third window 61, the third graph 62 is displayed, where the horizontal axis indicates the time and the vertical axis indicates the data value.

The third graph display processing unit 19, in a case where the third graph 62 has been selected from the above-described list, displays temporal variations of respective pieces of process data associated with the third graph 62 from among the pieces of various process data accumulated in the process data storage unit 11. The pieces of process data to be displayed on the third graph 62 are defined in advance in the above-described list (or graph definition file 14). In FIG. 8 (or FIG. 5), it is defined, for example, that the pieces of process data A and process data E are to be displayed on the graph c. In FIG. 9, the pieces of process data A and process data E associated with the graph c are displayed as the third graph 62.

On the third graph 62, the process data name (the indications of "process data A" and "process data E" in FIG. 9) and the third time cursor 65 are displayed. On the third graph 62, the process data of a time range including predetermined periods preceding and following the third time cursor 65 as the center (for example, several minutes or several hours) is indicated. The third graph display processing unit 19 moves the time range of the data to be displayed on the third graph 62 in accordance with the change of the time pointed to by the third time cursor 65 on the third graph 62. For example, in a case where the display position of the third time cursor 65 on the third window 61 is fixed, when the operator drags and drops the display area of the third graph 62 in the time axis (horizontal axis) direction, the time pointed to by the third time cursor 65 changes.

Also, the third graph display processing unit 19, in a case where the time Ta is input from the time coordination unit 15, changes the time pointed to by the third time cursor 65 to the time Ta.

In the coordination screen setting unit 16, a graph to be in coordination is specified in advance. In this embodiment, it is assumed that the target with which the time of the graph a, which is the first graph 42, should be coordinated is the graph c, which is the third graph 62.

The time coordination unit 15 includes the functions that have been described in the first embodiment. Further, the time coordination unit 15 changes the time pointed to by the third time cursor 65 to the time Ta and thereby displays, on the third graph 62, the process data (the pieces of process data A and E) of the same time as that of the process data (the pieces of process data A and C of FIG. 9) displayed on the first graph 42.

Specifically, the time coordination unit 15 inputs the time Ta from the first graph display processing unit 12, and stores it in the data storage unit 113b of the storage unit 113. In the coordination screen setting unit 16, the coordination between the first graph 42 and the third graph 62 is specified, and the time coordination unit 15 outputs the time Ta to the third graph display processing unit 19 in accordance with a screen operation by the operator (the operation of selecting the third graph 62 from the above-described list). As a result of this, the time coordination unit 15 causes the third graph display processing unit 19 to change the time pointed to by the third time cursor 65 to the time Ta. As a result, the time range of the data to be displayed on the third graph 62 becomes the same time range as that of the first graph 42. On the third graph 62, the respective pieces of process data (the pieces of process data A and E) including the piece of process data A common to the first graph 42 are displayed.

The data reproduction processing unit 17 is capable of reproducing each piece of the process data displayed on the first graph 42 and the third graph 62 in a coordinated manner. Specifically, data reproduction processing unit 17 defines the time Ta pointed to by the first time cursor 45 and the third time cursor 65 as a reproduction start time in accordance with a screen operation of the operator (for example, pressing of a reproduction button), and updates the time at issue at a predetermined reproduction speed. The first graph display processing unit 12 and the third graph display processing unit 19 move the time range of the data displayed on the first graph 42 and the third graph 62 in accordance with updating of the time.

(Flowchart)

Figure 10:
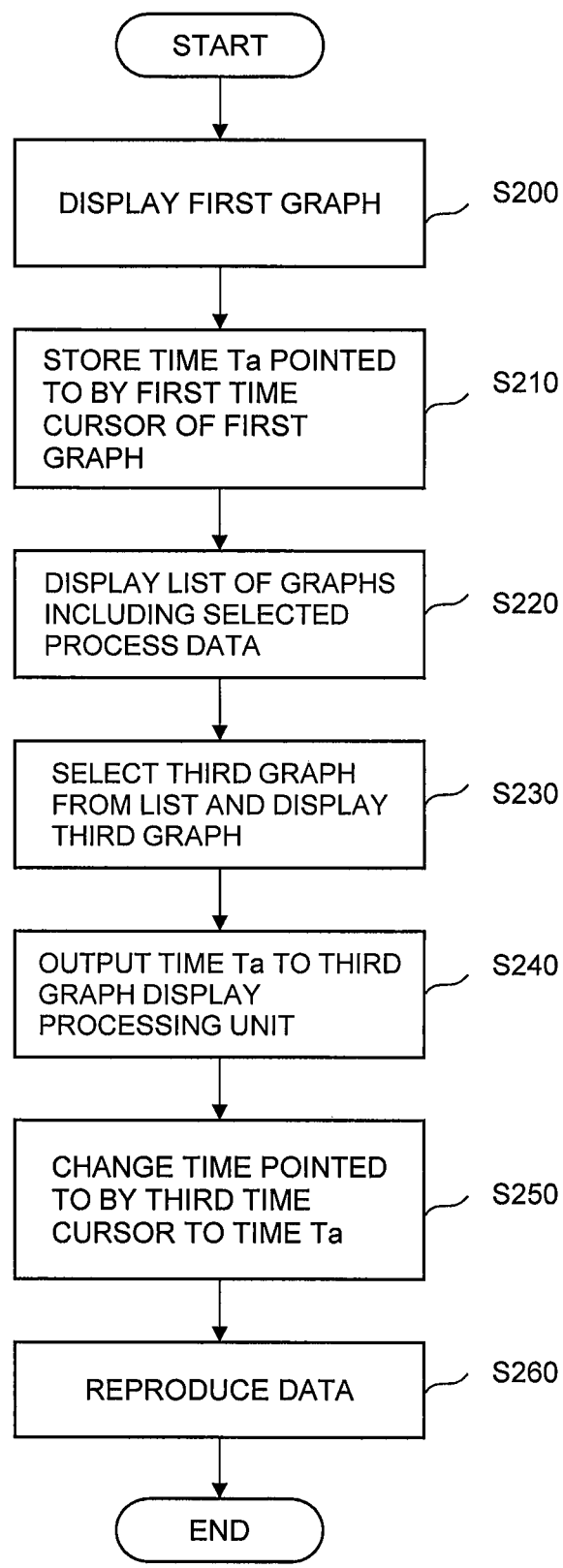
FIG. 10 is a flowchart of processing which the data reproduction device according to the second embodiment performs on the basis of a screen operation by an operator.

Next, the operation of the data reproduction device 1 will be described with reference to FIG. 10. FIG. 10 is a flowchart of processing which the data reproduction device 1 according to the second embodiment performs on the basis of a screen operation by an operator.

First, in the step S200, the data reproduction device 1 displays the first window 41 that includes the first graph 42 on the monitor 117 in accordance with a screen operation by the operator. Here, it is assumed that the graph a defined in the graph definition file 14 of FIG. 5 is designated as the first graph 42. The first graph display processing unit 12 reads the pieces of process data A and C associated with the graph a defined in the graph definition file 14 from the process data storage unit 11 and displays them on the first graph 42 (FIG. 9).

Next, in the step S210, the time coordination unit 15 stores a time Ta pointed to by the first time cursor 45 of the first graph 42. For example, time pointed to by the first time cursor 45 is changed by a screen operation by the operator and the first graph display processing unit 12 outputs the time Ta pointed to by the first time cursor 45 to the time coordination unit 15. The time coordination unit 15 stores the time Ta.

Next, in the step S220, the selected process data coordination graph display unit 18 displays, in a case where the name of the first process data displayed on the first graph 42 has been selected by a screen operation by the operator, a list of graphs that includes the first process data on the basis of the graph definition file 14. For example, according to the graph definition file 14 illustrated in FIG. 5, in a case where a graph of the process data A has been designated as the first process data, the graphs that include the process data A include the graph a, the graph c, and the graph d, and these graphs are displayed as listing thereof in the form of a list in a new window list (FIG. 8).

Next, in the step S230, the data reproduction device 1, in a case where the third graph 62 has been selected from the above-described list, displays the third window 61 including the third graph 62 on the monitor 117. Here, it is assumed that the graph c defined in the list of FIG. 8 (or the graph definition file 14 of FIG. 5) has been selected as the third graph 62. The third graph display processing unit 19 reads, from the process data storage unit 11, the pieces of process data A and E associated with the graph c defined in the graph definition file 14, and displays them on the third graph 62 (FIG. 9).

Next, in the step S240, the time coordination unit 15 outputs the time Ta to the third graph display processing unit 19. Specifically, in the coordination screen setting unit 16, the coordination between the first graph 42 and the third graph 62 is specified, and the time coordination unit 15 outputs the time Ta to the third graph display processing unit 19 in accordance with a screen operation by the operator (the operation of selecting the third graph 62 from the above-described list).

Next, in the step S250, the third graph display processing unit 19 changes the time pointed to by the third time cursor 65 of the third graph 62 to the time Ta. As a result of this, on the third graph 62, the respective pieces of process data (process data A and E) including the piece of process data A common to the first graph 42 are displayed.

Next, in the step S260, the data reproduction processing unit 17 simultaneously reproduces the pieces of process data of the same time displayed on the first graph 42 and the third graph 62 in accordance with a reproduction operation of the operator (for example, pressing of a reproduction button).
(Effect)

As has been described in the foregoing, the data reproduction device 1 according to the second embodiment, the name of the particular piece of process data is selected from the first graph 42 and the graph list including other process data associated with the particular piece of process data in advance can be displayed. Further, the third graph 62 selected from the list can be displayed with the same range as that of the first graph 42. Particular pieces of process data selected from the first graph and the other process data relevant thereto can be displayed on the third graph with their times automatically brought into agreement, so that the operation of the operator on the graph on the data reproduction device 1 is facilitated, and it is made possible to recognize the state of the industrial plant in a short time.

Third Embodiment

Figure 12:
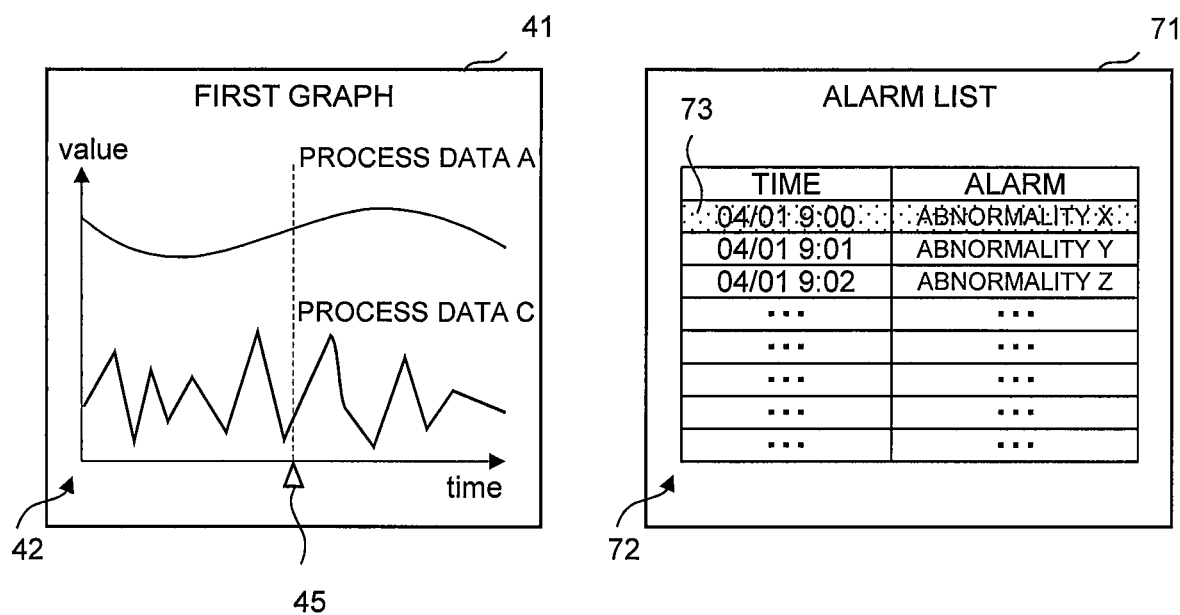
FIG. 12 is a diagram for explanation of a display example of a first window and a fourth window displayed on a monitor of the data reproduction device.
Figure 13:
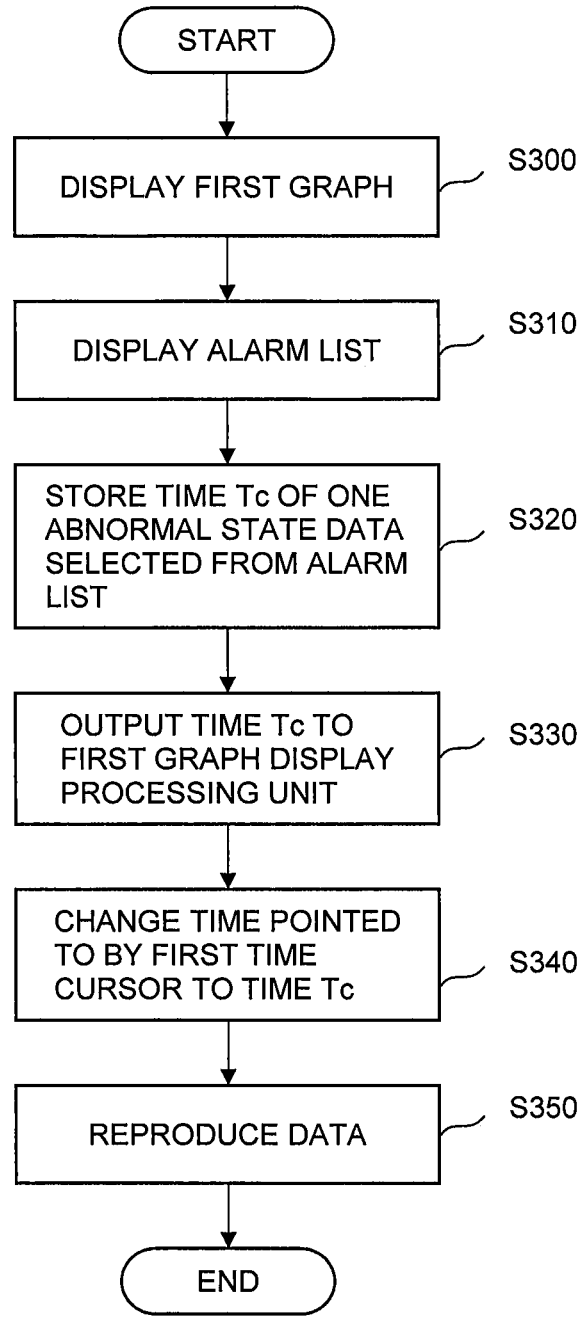
FIG. 13 is a flowchart of processing which the data reproduction device according to the third embodiment performs on the basis of a screen operation by an operator.

Next, the third embodiment will be described with reference to FIGS. 11 to 13. In the above-described first and second embodiments, display can be provided such that the time ranges of the process data displayed on multiple graphs are brought into agreement. In the meantime, a plant management and control system also collects abnormal state data of the system and the plant in addition to the process data. In order to recognize the state of the plant when an abnormality occurs, it is necessary to confirm from the graphs the process data associated with the abnormality but, conventionally, display is provided such that the times of a list of the abnormal state data and the graph of the process data are manually brought into agreement. As a result, the operation on the graphs on the data reproduction device is complicated and it takes time to recognize the state of the industrial plant at the time of abnormality.

In view of this, in the third embodiment, it is made possible to automatically display, on a graph, the process data of the same time as the time of the abnormal state data selected from an alarm list.
(Data Reproduction Device)

Figure 11:
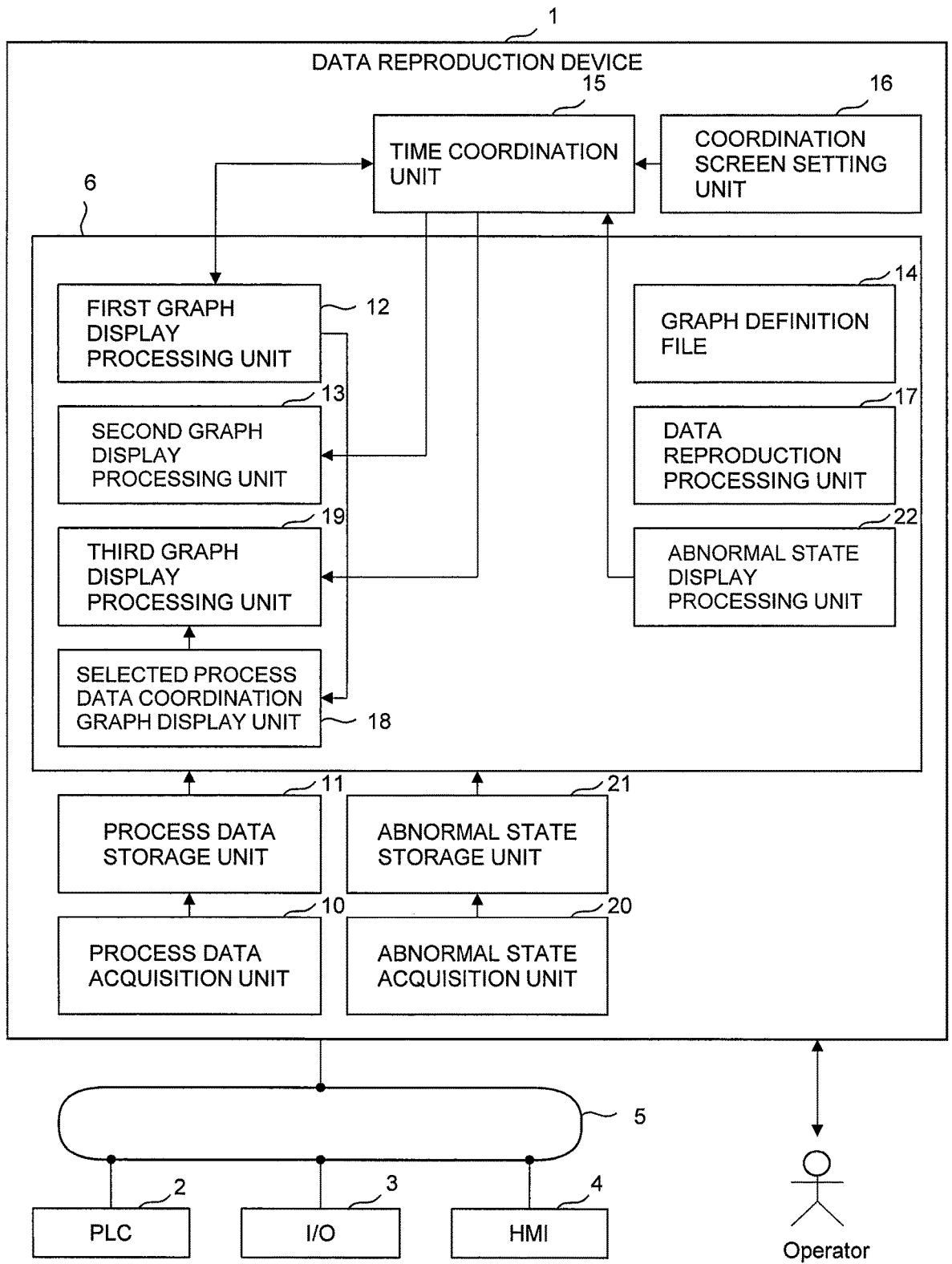
FIG. 11 is a functional block diagram of a data reproduction device according to the third embodiment.

FIG. 11 is a functional block diagram of the data reproduction device 1 according to the third embodiment. The configuration illustrated in FIG. 11 is the same as the above-described configuration of FIG. 7 except that an abnormal state acquisition unit 20, an abnormal state storage unit 21, and an abnormal state display processing unit 22 are additionally provided and that the processes of the first graph display processing unit 12, the time coordination unit 15, and the data reproduction processing unit 17 are extended. Also, the functions of the abnormal state acquisition unit 20 and the abnormal state storage unit 21 are effectuated by executing the data collection program that has been described in the first embodiment.

The abnormal state acquisition unit 20 acquires, from the HMI 4 which is a monitor control device, abnormal state data of the industrial plant output to the control network 5. The abnormal state data comprises data acquisition time and content of failure.

The abnormal state storage unit 21 accumulates the abnormal state data at each time in the data storage unit 113b of the storage unit 113.

The first graph display processing unit 12 includes the functions that have been described in the first and second embodiments. Further, the first graph display processing unit 12 changes the time pointed to by the first time cursor 45 to a time Tc which will be described later in a case where the time Tc has been input from the time coordination unit 15.

The abnormal state display processing unit 22 will be described with reference to FIG. 12. FIG. 12 is a diagram for explanation of a display example of the first window and a fourth window displayed on the monitor 117 of the data reproduction device 1. The first window is the same as that in the above-described first embodiment and accordingly explanation thereof is omitted.

The abnormal state display processing unit 22 displays a fourth window 71 on the monitor 117 in accordance with an operation of the operator. In the fourth window 71, an alarm list 72 which includes abnormal state data at each time is displayed.

The abnormal state display processing unit 22 displays the pieces of abnormal state data accumulated in the abnormal state storage unit 21 in the alarm list 72 in a chronological order. The pieces of abnormal state data displayed in the alarm list 72 can be selected on a per-row basis by the operator, and the selection state is displayed by the selection cursor 73. In the alarm list 72, the pieces of abnormal state data by the number of rows corresponding to the display size of the fourth window 71 are displayed in the form of a list in a chronological order, and abnormal state data of any time range can be displayed.

The abnormal state display processing unit 22 outputs, to the time coordination unit 15, the time Tc of the one abnormal state data selected from the alarm list 72 (the abnormal state data in the state where it is selected by a selection cursor 73).

The time coordination unit 15 includes the functions that have been described in the first and second embodiments. Further, the time coordination unit 15 stores the time Tc of one piece of abnormal state data selected from the alarm list 72, changes the time indicated by the first time cursor 45 to the time Tc, and thereby displays the process data of the same time and the abnormal state data on the first graph 42 and in the alarm list 72.

Specifically, the time coordination unit 15 inputs the time Tc from the abnormal state display processing unit 22 and stores it in the data storage unit 113b of the storage unit 113. In the coordination screen setting unit 16, the coordination between the first graph 42 and the alarm list 72 is specified, and the time coordination unit 15 outputs the time Tc to the first graph display processing unit 12 in accordance with a screen operation by the operator (an operation of selecting one piece of abnormal state data from the above-described alarm list 72). As a result of this, the time coordination unit 15 causes the first graph display processing unit 12 to change the time pointed to by the first time cursor 45 to the time Tc. As a result, on the first graph 42, the process data of the same time as that of the abnormal state data selected from the alarm list 72 is displayed.

The data reproduction processing unit 17 is capable of reproducing each piece of data displayed on the first graph 42 and the alarm list 72 in a coordinated manner.
(Flowchart)

Next, the operation of the data reproduction device 1 will be described with reference to FIG. 13. FIG. 13 is a flowchart of processing which the data reproduction device 1 according to the third embodiment performs on the basis of a screen operation by an operator.

First, in the step S300, the data reproduction device 1 displays the first window 41 that includes the first graph 42 on the monitor 117 in accordance with a screen operation by the operator. Here, it is assumed that the graph a defined in the graph definition file 14 of FIG. 5 is designated as the first graph 42. The first graph display processing unit 12 reads, from the process data storage unit 11, the pieces of process data A and C associated with the graph a defined in the graph definition file 14 and displays them on the first graph 42 (FIG. 12).

Next, in the step S310, the data reproduction device 1 displays, on the monitor 117, the fourth window 71 which includes the alarm list 72 in accordance with a screen operation by the operator. The abnormal state display processing unit 22 reads the pieces of abnormal state data from the abnormal state storage unit 21 and displays the pieces of abnormal state data in the alarm list 72 in a chronological order (FIG. 12).

Next, in the step S320, the time coordination unit 15 stores the time Tc of one piece of abnormal state data selected from the alarm list 72. Specifically, one piece of abnormal state data is selected from the alarm list 72 by a screen operation by the operator, and the abnormal state display processing unit 22 outputs the time Tc of the selected piece of abnormal state data to the time coordination unit 15. The time coordination unit 15 stores the time Tc.

Next, in the step S330, the time coordination unit 15 outputs the time Tc to the first graph display processing unit 12. Specifically, in the coordination screen setting unit 16, the coordination between the first graph 42 and the alarm list 72 is specified, and the time coordination unit 15 outputs the time Tc to the first graph display processing unit 12 in accordance with a screen operation of the operator (for example, pressing of a coordination button).

Next, in the step S340, the first graph display processing unit 12 changes the time pointed to by the first time cursor 45 of the first graph 42 to the time Tc. As a result of this, on the first graph 42, the process data of the same time as that of the abnormal state data selected from the alarm list 72 is displayed.

Next, in the step S350, the data reproduction processing unit 17 simultaneously reproduces the pieces of data of the same time displayed on the first graph 42 and the alarm list 72 in accordance with a reproduction operation of the operator (for example, pressing of a reproduction button).
(Effect)

As has been described in the foregoing, according to the data reproduction device 1 in accordance with the third embodiment, it is possible to automatically display the process data of the same time as the time of the piece of the abnormal state data selected from the alarm list 72. As a result, in the course of utilization of the data reproduction device 1, there is no need of complicated operations to manually bring the reproduction start times of the respective pieces of data into agreement, and the labor and time to recognize the state of the industrial plant can be reduced when an abnormality occurs.

Modified Example

In the meantime, the data reproduction device 1 of the above-described third embodiment is configured to coordinate the time of the alarm list 72 with the time of the first graph 42, but is not limited to this. The time of the alarm list 72 may be coordinated with the second graph 52 and the third graph 62.

Also, the data reproduction device 1 of the above-described third embodiment is based on the configuration of FIG. 7 that has been described in the second embodiment, but may also be configured to not include the third graph display processing unit 19 and the selected process data coordination graph display unit 18.

Fourth Embodiment

Figure 15:
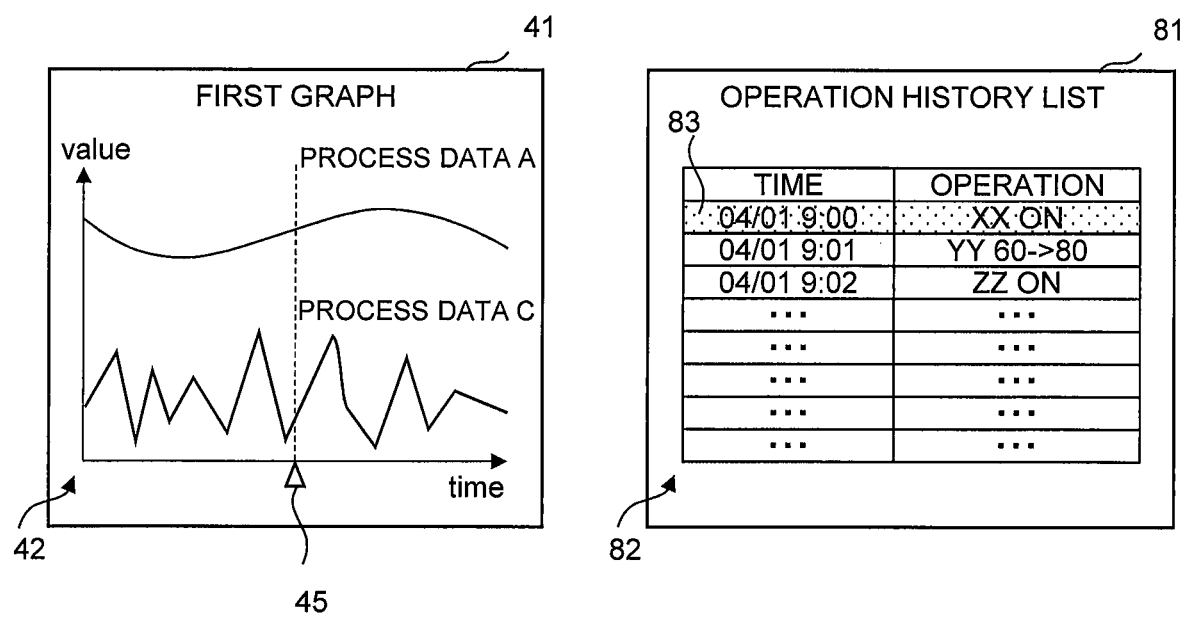
FIG. 15 is a diagram for explanation of a display example of a first window and a fifth window displayed on a monitor of the data reproduction device.
Figure 16:
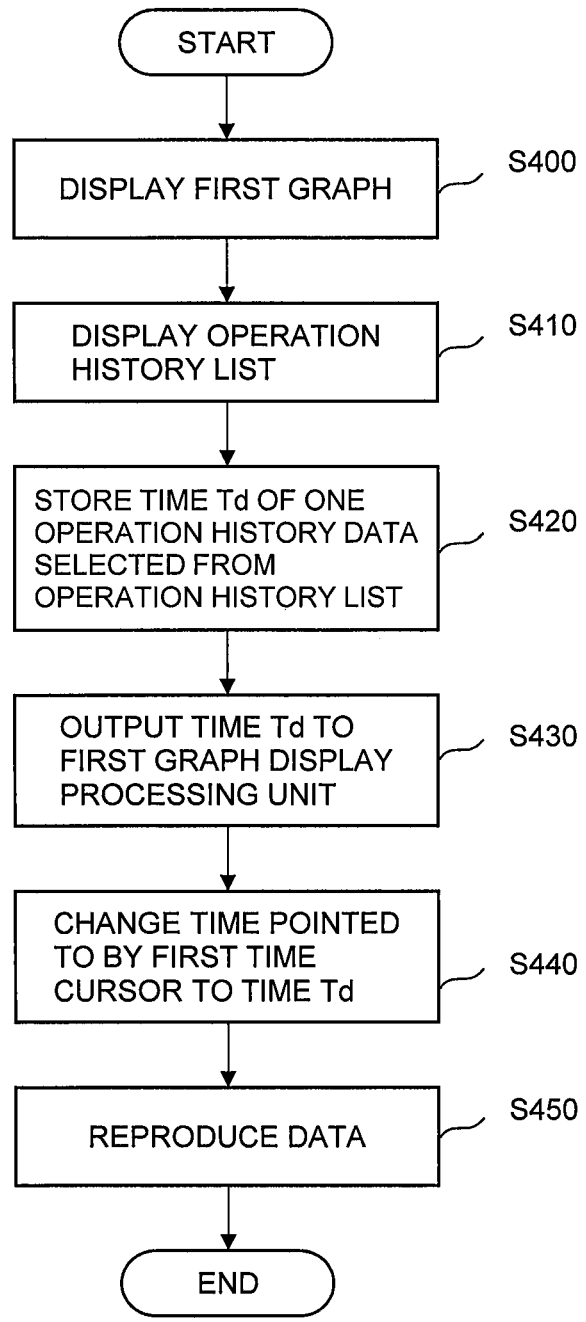
FIG. 16 is a flowchart of processing which the data reproduction device according to the fourth embodiment performs on the basis of a screen operation by an operator.

Next, the fourth embodiment will be described with reference to FIGS. 14 to 16. In the above-described first and second embodiments, display can be provided such that the time ranges of the process data displayed on multiple graphs are brought into agreement. In the meantime, the plant management and control system also collects operation history data regarding the operations made on the devices of the plants on a monitor control device (HMI 4) in addition to the process data. In order to recognize the state of the plant at the time when the device is operated, it is necessary to confirm from the graphs the process data of the device associated with the operation but, conventionally, display is provided such that the times of a list of the operation history data and the graph of the process data are manually brought into agreement. As a result, the operation on the graphs on the data reproduction device is complicated and it takes time to recognize the state of the industrial plant at the time when the device of the industrial plant is operated.

In view of this, in the fourth embodiment, it is made possible to automatically display, on a graph, the process data of the same time as the time of the operation history data selected from an operation history list.
(Data Reproduction Device)

Figure 14:
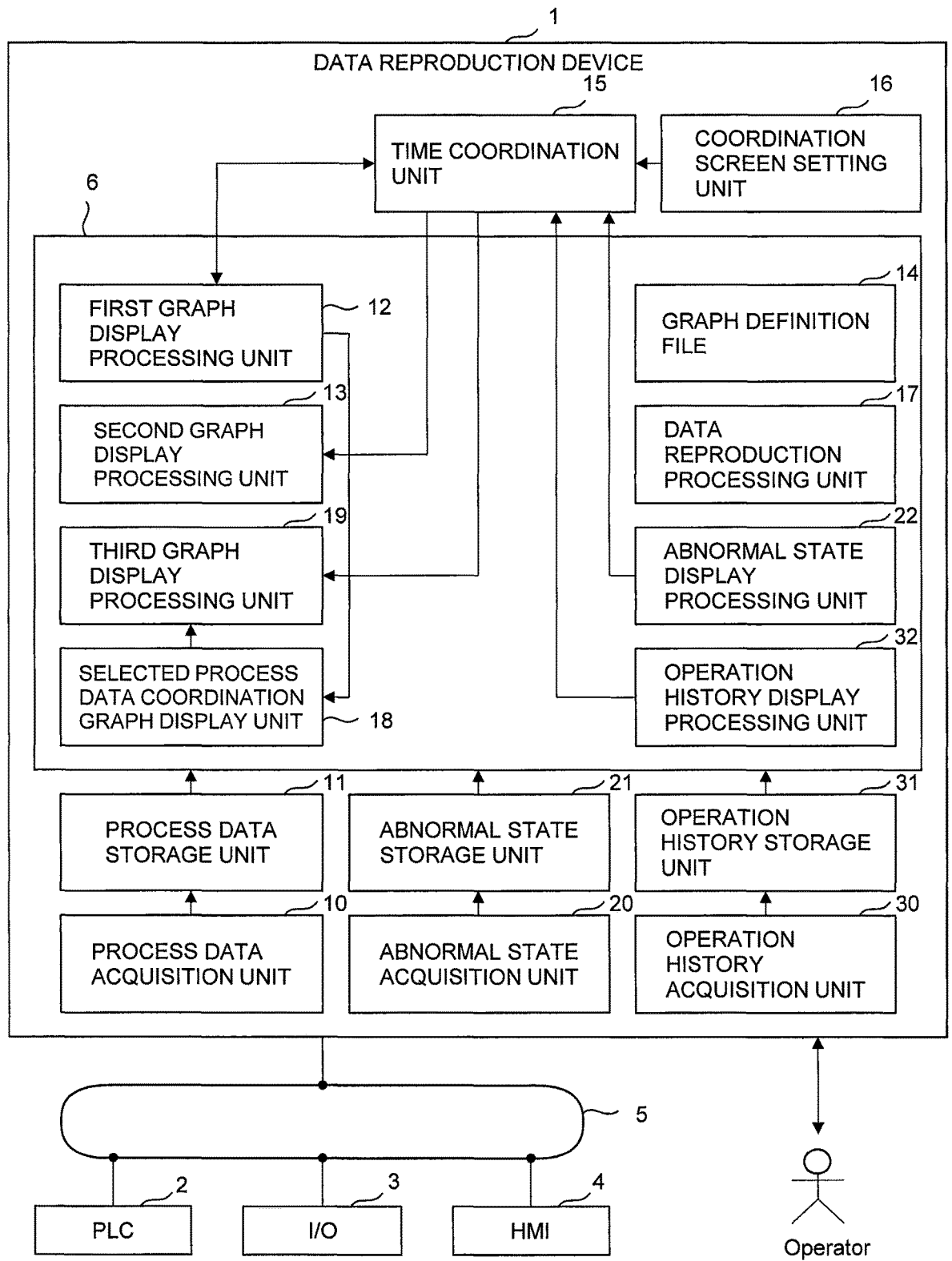
FIG. 14 is a functional block diagram of a data reproduction device according to the fourth embodiment.

FIG. 14 is a functional block diagram of the data reproduction device 1 according to the fourth embodiment. The configuration illustrated in FIG. 14 is the same as the above-described configuration of FIG. 11 except that an operation history acquisition unit 30, an operation history storage unit 31, and an operation history display processing unit 32 are additionally provided and that the processes of the first graph display processing unit 12, the time coordination unit 15, and the data reproduction processing unit 17 are extended. Also, the functions of the operation history acquisition unit 30 and the operation history storage unit 31 are effectuated by executing the data collection program that has been described in the first embodiment.

The operation history acquisition unit 30 acquires the operation history data of the HMI 4 output from the HMI 4 which is a monitor control device to the control network 5. The operation history data comprises data acquisition time and content of the operation made on the device of the plant on the monitor control device (HMI 4).

The operation history storage unit 31 accumulates the operation history data at each time in the data storage unit 113b of the storage unit 113.

The first graph display processing unit 12 includes the functions that have been described in the first to third embodiments. Further, the first graph display processing unit 12 changes the time pointed to by the first time cursor 45 to a time Td which will be described later in a case where the time Td has been input from the time coordination unit 15.

The operation history display processing unit 32 will be described with reference to FIG. 15. FIG. 15 is a diagram for explanation of the display example of the first window and a fifth window displayed on the monitor 117 of the data reproduction device 1. The first window is the same as that in the above-described first embodiment and accordingly explanation thereof is omitted.

The operation history display processing unit 32 displays the fifth window 81 on the monitor 117 in accordance with an operation of the operator. In the fifth window 81, an operation history list 82 including pieces of operation history data at each time is displayed.

The operation history display processing unit 32 displays the operation history data accumulated in the operation history storage unit 31 in the operation history list 82 in a chronological order in the form of a list. The pieces of the operation history data displayed in the operation history list 82 are selectable on a per-row basis by the operator, and the selection state is displayed by the selection cursor 83. In the operation history list 82, the pieces of the operation history data by the number of elements corresponding to the display size of the fifth window 81 are displayed in a chronological order in the form of a list, and the operation history data within any time range can be displayed.

The operation history display processing unit 32 outputs time Td of the one piece of operation history data selected from the operation history list 82 (the operation history data in the selected state by the selection cursor 83) to the time coordination unit 15.

The time coordination unit 15 includes the functions that have been described in the first to third embodiments. Further, the time coordination unit 15 stores the time Td of the one operation history data selected from the operation history list 82, changes the time pointed to by the first time cursor 45 to the time Td, and thereby displays process data of the same time and the operation history data on the first graph 42 and the operation history list 82.

Specifically, the time coordination unit 15 inputs the time Td from the operation history display processing unit 32 and stores it in the data storage unit 113b of the storage unit 113. In the coordination screen setting unit 16, the coordination between the first graph 42 and the operation history list 82 is specified, and the time coordination unit 15 outputs the time Td to the first graph display processing unit 12 in accordance with a screen operation by the operator (an operation of selecting one piece of operation history data from the above-described operation history list 82). As a result of this, the time coordination unit 15 causes the first graph display processing unit 12 to change the time pointed to by the first time cursor 45 to the time Td. As a result, on the first graph 42, the pieces of process data of the same time as that of the operation history data selected from the operation history list 82 are displayed.

The data reproduction processing unit 17 is capable of reproducing each piece of data displayed on the first graph 42 and the operation history list 82 in a coordinated manner.
(Flowchart)

Next, the operation of the data reproduction device 1 will be described with reference to FIG. 16. FIG. 16 is a flowchart of processing which the data reproduction device 1 according to the fourth embodiment performs on the basis of a screen operation by an operator.

First, in the step S400, the data reproduction device 1 displays the first window 41 that includes the first graph 42 on the monitor 117 in accordance with a screen operation by the operator. Here, it is assumed that the graph a defined in the graph definition file 14 of FIG. 5 has been designated as the first graph 42. The first graph display processing unit 12 reads the pieces of process data A and C associated with the graph a defined in the graph definition file 14 from the process data storage unit 11 and displays them on the first graph 42 (FIG. 15).

Next, in the step S410, the data reproduction device 1 displays the fifth window 81 including the operation history list 82 on the monitor 117 in accordance with a screen operation by the operator. The operation history display processing unit 32 reads the pieces of operation history data from the operation history storage unit 31 and displays it in the operation history list 82 in a chronological order (FIG. 15).

Next, in the step S420, the time coordination unit 15 stores the time Td of the one piece of operation history data selected from the operation history list 82. Specifically, one piece of the operation history data is selected from the operation history list 82 by a screen operation by the operator, and the operation history display processing unit 32 outputs the time Td of the selected operation history data to the time coordination unit 15. The time coordination unit 15 stores the time Td.

Next, in the step S430, the time coordination unit 15 outputs the time Td to the first graph display processing unit 12. Specifically, in the coordination screen setting unit 16, the coordination between the first graph 42 and the operation history list 82 is specified, and the time coordination unit 15 outputs the time Td to the first graph display processing unit 12 in accordance with a screen operation of the operator (for example, pressing of a coordination button).

Next, in the step S440, the first graph display processing unit 12 changes the time pointed to by the first time cursor 45 of the first graph 42 to the time Td. As a result of this, on the first graph 42, the process data of the same time as that of the abnormal state data selected from the operation history list 82 is displayed.

Next, in the step S450, the data reproduction processing unit 17 simultaneously reproduces the pieces of data of the same time displayed on the first graph 42 and the operation history list 82 in accordance with a reproduction operation of the operator (for example, pressing of a reproduction button).
(Effect)

As has been described in the foregoing, according to the data reproduction device 1 in accordance with the fourth embodiment, it is possible to automatically display the pieces of process data of the same time as the time of the one piece of the operation history data selected from the operation history list. As a result, in the course of utilization of the data reproduction device, there is no need for complicated operations to manually bring the reproduction start times of the respective pieces of data into agreement, and the labor and time to recognize the state of the industrial plant can be reduced when the devices of the industrial plant are operated.

Modified Example

In the meantime, the data reproduction device 1 of the above-described fourth embodiment is configured to coordinate the time of the operation history list 82 with the time of the first graph 42 but is not limited to this. The time of the operation history list 82 may be coordinated with the second graph 52 or the third graph 62 or the alarm list 72.

Also, the data reproduction device 1 of the above-described fourth embodiment is based on the configuration of FIG. 11 which has been described in the third embodiment, but may be configured to not include the third graph display processing unit 19 and the selected process data coordination graph display unit 18. Also, it may also be configured to not include the abnormal state acquisition unit 20, the abnormal state storage unit 21, and the abnormal state display processing unit 22.

Fifth Embodiment

Next, the fifth embodiment will be described. In the fifth embodiment, in a case where the display area of the first graph 42 of FIG. 4 is scrolled in the time axis (horizontal axis) direction by a screen operation by the operator and the time range of data displayed on the first graph 42 moves continuously, the time range of the data displayed on the second graph 52 is also moved in conjunction therewith.
(Data Reproduction Device)

The configuration of the data reproduction device 1 according to the fifth embodiment is identical with the above-described configuration of FIG. 3 (or FIGS. 7, 11, and 14) except that the processing of the time coordination unit 15 is extended.

The time coordination unit 15, in a case where the time Ta pointed to by the first time cursor 45 is continuously changed by an operation on the first graph 42, changes the time pointed to by the second time cursor 55 to the time Ta in synchronization with the change of the time Ta. As a result of this, time coordination unit 15 moves the time range of the data displayed on the second graph 52 in synchronization with the time range of data displayed on the first graph 42.

Specifically, the time coordination unit 15 continuously inputs the time Ta from the first graph display processing unit 12. In the coordination screen setting unit 16, the coordination between the first graph 42 and the second graph 52 is specified, and the time coordination unit 15 outputs the continuously input time Ta to the second graph display processing unit 13 in accordance with a screen operation by the operator (for example, an operation of scrolling by dragging and dropping the display area of the first graph 42 in the time axis (horizontal axis) direction). As a result of this, the time pointed to by the second time cursor 55 is updated in synchronization with the change of the time Ta. As a result, the time range of the data displayed on the second graph 52 moves in synchronization with the time range of data displayed on the first graph 42.

Modified Example

In the meantime, the time coordination unit 15 of the above-described fifth embodiment may further change the time pointed to by the first time cursor 45 to the time Tb in synchronization with a change of the time Tb in a case where the time Tb pointed to by the second time cursor 55 changes continuously by a screen operation by the operator (for example, an operation of scrolling by dragging and dropping the display area of the second graph 52 in the time axis (horizontal axis) direction). As a result of this, the time coordination unit 15 can move the time range of data displayed on the first graph 42 in synchronization with the time range of the data displayed on the second graph 52.

Sixth Embodiment

Next, the sixth embodiment will be described. In the sixth embodiment, in a case where the display area of the first graph 42 of FIG. 9 is scrolled in the time axis (horizontal axis) direction by a screen operation by the operator and the time range of data displayed on the first graph 42 moves continuously, the time range of the data to be displayed on the third graph 62 is also moved in conjunction therewith.
(Data Reproduction Device)

The configuration of the data reproduction device 1 according to the sixth embodiment is identical with the above-described configuration of FIG. 7 (or FIGS. 11 and 14) except that the processing by the time coordination unit 15 is extended.

The time coordination unit 15, in a case where the time Ta pointed to by the first time cursor 45 is continuously changed by an operation on the first graph 42, changes the time pointed to by the third time cursor 65 to the time Ta in synchronization with the change of the time Ta. As a result of this, the time coordination unit 15 moves the time range of the data to be displayed on the third graph 62 in synchronization with the time range of data displayed on the first graph 42.

Specifically, the time coordination unit 15 continuously inputs the time Ta from the first graph display processing unit 12. In the coordination screen setting unit 16, the coordination between the first graph 42 and the third graph 62 is specified, and the time coordination unit 15 outputs the continuously input time Ta to the third graph display processing unit 19 in accordance with a screen operation by the operator (for example, an operation of scrolling by dragging and dropping the display area of the first graph 42 in the time axis (horizontal axis) direction). As a result of this, the time pointed to by the third time cursor 65 is updated in synchronization with the change of the time Ta. As a result, the time range of the data to be displayed on the third graph 62 is moved in synchronization with the time range of data displayed on the first graph 42.

Modified Example

In the meantime, the time coordination unit 15 of the above-described sixth embodiment may further change the time pointed to by the first time cursor 45 to the time $Tb_2$ in synchronization with the change of the time $Tb_2$ in a case where the time $Tb_2$ pointed to by the third time cursor 65 is continuously changed by a screen operation by the operator (for example, an operation of scrolling by dragging and dropping the display area of the third graph 62 in the time axis (horizontal axis) direction). As a result of this, the time coordination unit 15 can move the time range of data displayed on the first graph 42 in synchronization with the time range of the data to be displayed on the third graph 62.

Seventh Embodiment

Next, the seventh embodiment will be described. In the seventh embodiment, in a case where the time range displayed in the alarm list 72 of FIG. 12 is changed by a screen operation by the operator, the time range of data displayed on the first graph 42 is also moved in conjunction therewith.
(Data Reproduction Device)

The configuration of the data reproduction device 1 according to the seventh embodiment is identical with the above-described configuration of FIG. 11 or 14 except that the processing of the time coordination unit 15 is extended.

The time coordination unit 15, in a case where the time Tc of the abnormal state data selected on the alarm list 72 is continuously changed by an operation on the alarm list 72, changes the time pointed to by the first time cursor 45 to the time Tc in synchronization with the change of the time Tc. As a result of this, the time range of data displayed on the first graph 42 is moved in synchronization with the time range of data displayed in the alarm list 72.

Specifically, the time coordination unit 15 continuously inputs the time Tc from the abnormal state display processing unit 22. In the coordination screen setting unit 16, the coordination between the first graph 42 and the alarm list 72 is specified, and the time coordination unit 15 outputs the continuously input time Tc to the first graph display processing unit 12 in accordance with a screen operation by the operator (for example, an operation of causing the alarm list 72 to scroll and changing the abnormal state data pointed to by the selection cursor 73). As a result of this, the time pointed to by the first time cursor 45 is updated in synchronization with the change of the time Tc. As a result, the time range of data displayed on the first graph 42 moves in synchronization with the time range of data displayed in the alarm list 72.

Modified Example

In the meantime, the time coordination unit 15 according to the above-described seventh embodiment may further change the time of the abnormal state data selected by the selection cursor 73 of the alarm list 72 to the time Ta in synchronization with the change of the time Ta in a case where the time Ta pointed to by the first time cursor 45 is continuously changed by a screen operation by the operator (for example, an operation of scrolling by dragging and dropping the display area of the first graph 42 in the time axis (horizontal axis) direction). As a result of this, the time coordination unit 15 can move the time range of data displayed in the alarm list 72 in synchronization with the time range of data displayed on the first graph 42.

Eighth Embodiment

Next, the eighth embodiment will be described. In the eighth embodiment, the time range displayed in the operation history list 82 of FIG. 15 is continuously changed by a screen operation by the operator, the time range of data displayed on the first graph 42 is also moved in conjunction therewith.

(Data Reproduction Device)

The configuration of the data reproduction device 1 according to the eighth embodiment is identical with the above-described configuration of FIG. 14 except that the processing of the time coordination unit 15 is extended.

The time coordination unit 15, in a case where time Td of the operation history data selected on the operation history list 82 is continuously changed by an operation on the operation history list 82, changes the time pointed to by the first time cursor 45 to the time Td in synchronization with the change of the time Td. As a result of this, the time range of data displayed on the first graph 42 is moved in synchronization with the time range of data displayed in the operation history list 82.

Specifically, the time coordination unit 15 continuously inputs the time Td from the operation history display processing unit 32. In the coordination screen setting unit 16, the coordination between the first graph 42 and the operation history list 82 is specified, and the time coordination unit 15 outputs the continuously input time Td to the first graph display processing unit 12 in accordance with a screen operation by the operator (for example, an operation of causing the operation history list 82 to scroll and changing the operation history data pointed to by the selection cursor 83). As a result, the time pointed to by the first time cursor 45 is updated in synchronization with the change of the time Td. As a result, the time range of data displayed on the first graph 42 moves in synchronization with the time range of data displayed in the operation history list 82.

Modified Example

In the meantime, the time coordination unit 15 of the above-described eighth embodiment may further change the time of the piece of the operation history data selected by the selection cursor 83 of the operation history list 82 to the time Ta in synchronization with the change of the time Ta in a case where the time Ta pointed to by the first time cursor 45 is continuously changed by a screen operation by the operator (for example, an operation of scrolling by dragging and dropping the display area of the first graph 42 in the time axis (horizontal axis) direction). As a result of this, the time coordination unit 15 can move the time range of data displayed in the operation history list 82 in synchronization with the time range of data displayed on the first graph 42.

As has been described in the foregoing, while the embodiments of the present invention have been described, the present invention is not limited to the above-described embodiments and can be implemented with various modifications made thereto within the range where the purport of the present invention is not deviated from.

REFERENCE SIGNS LIST

1: data reproduction device
2: PLC (programmable logic controller)
3: input/output device (I/O)
4: HMI
5: control network
5a to 5d: nodes A to D
6: screen display processing unit
10: process data acquisition unit
11: process data storage unit
12: first graph display processing unit
13: second graph display processing unit
14: graph definition file
15: time coordination unit
16: coordination screen setting unit
17: data reproduction processing unit
18: selected process data coordination graph display unit
19: third graph display processing unit
20: abnormal state acquisition unit
21: abnormal state storage unit
22: abnormal state display processing unit
30: operation history acquisition unit
31: operation history storage unit
32: operation history display processing unit
41: first window
42: first graph
45: first time cursor
51: second window
52: second graph
55: second time cursor
61: third window
62: third graph
65: third time cursor
71: fourth window
72: alarm list
73: selection cursor
81: fifth window 82: operation history list
83: selection cursor
111: CPU
112: memory unit
113, 113a, and 113b: storage unit, program storage unit, data storage unit
114: external device I/F unit
115: network I/F unit
116: internal bus
117: monitor
118: keyboard
119: mouse

The invention claimed is:

1. A data reproduction device for an industrial plant, the data reproduction device being connected to an input/output device that connects to devices constituting the industrial plant and a programmable logic controller that controls the devices, via a control network, the data reproduction device for the industrial plant comprising:
   a processor to execute a program; and
   a memory to store the program which, when executed by the processor, causes the data reproduction device to execute the following steps:
   acquire various pieces of process data output to the control network from the programmable logic controller and the input/output device;
   accumulate the various pieces of process data at each time;
   display on a first graph, a temporal variation of first process data, and move a time range of data displayed on the first graph in accordance with a change of time pointed to by a first time cursor on the first graph;
   display on a second graph, a temporal variation of second process data, and move a time range of data displayed on the second graph in accordance with a change of time pointed to by a second time cursor on the second graph;
   store a pointed to by the first time cursor and changes a time pointed to by the second time cursor to the time Ta, and thereby causes the second process data of the same time as that of the first process data displayed on the first graph to be displayed on the second graph;
   reproduce the respective pieces of process data displayed on the first graph and the second graph in a coordinated manner;
   define, by a graph definition file, a plurality of pieces of process data to be displayed on one graph, the pieces of process data being defined for each graph;
   in response to a name of the first process data displayed on the first graph being selected, based on the graph definition file, display a list of graphs that include the first process data; and
   in response to a third graph being selected from the list, from among the various pieces of process data, display a temporal variation of each process data associated with the third graph on the third graph and move a time range of data displayed on the third graph in accordance with a change of time pointed to by a third time cursor on the third graph;
   change a time pointed to by the third time cursor to the time Ta and thereby display, on the third graph, each piece of process data of the same time as that of the first process data displayed on the first graph; and
   reproduce each piece of process data displayed on the first graph and the third graph in a coordinated manner.

2. The data reproduction device for an industrial plant according to claim 1, wherein the program causes the data reproduction device to:
   acquire abnormal state data of the industrial plant output from a monitor control device to the control network;
   accumulate the abnormal state data at each time;
   display the abnormal state data in an alarm list in chronological order;
   store a time Tc of one piece of the abnormal state data selected from the alarm list, change a time pointed to by the first time cursor to the time Tc, and thereby display the first process data of the same time and the abnormal state data on the first graph and the alarm list; and
   reproduce each piece of data displayed on the first graph and the alarm list in a coordinated manner.

3. The data reproduction device for an industrial plant according to claim 2, wherein the program causes the data reproduction device to, in a case where the time Tc of abnormal state data selected on the alarm list continuously changes by an operation on the alarm list, change a time pointed to by the first time cursor to the time Tc in synchronization with a change of the time Tc, and thereby move a time range of data displayed on the first graph in synchronization with a time range of data displayed on the alarm list.

4. The data reproduction device for an industrial plant according to claim 1, wherein the program causes the data reproduction device to:
   acquire operation history data of the monitor control device output from a monitor control device to the control network;
   accumulate the operation history data at each time;
   display the operation history data on an operation history list in chronological order;
   store a time Td of one piece of the operation history data selected from the operation history list, change a time pointed to by the first time cursor to the time Td, and thereby cause the first process data of the same time and the operation history data to be displayed on the first graph and the operation history list; and
   reproduce each piece of data displayed on the first graph and the operation history list in a coordinated manner.

5. The data reproduction device for an industrial plant according to claim 4, wherein the program causes the data reproduction device to, in a case where the time Td of operation history data selected on the operation history list by an operation on the operation history list changes continuously, change a time pointed to by the first time cursor to the time Td in synchronization with a change of the time Td, and thereby move a time range of data displayed on the first graph in synchronization with a time range of data displayed on the operation history list.

6. The data reproduction device for an industrial plant according to claim 1, wherein the program causes the data reproduction device to, in a case where the time Ta pointed to by the first time cursor continuously changes by an operation on the first graph, change a time pointed to by the second time cursor to the time Ta in synchronization with a change of the time Ta, and thereby move a time range of data displayed on the second graph in synchronization with a time range of data displayed on the first graph.

7. The data reproduction device for an industrial plant according to claim 1, wherein the program causes the data reproduction device to, in a case where the time Ta pointed to by the first time cursor continuously changes by an operation on the first graph, change a time pointed to by the third time cursor to the time Ta in synchronization with a change of the time Ta, and thereby move a time range of data displayed on the third graph in synchronization with a time range of data displayed on the first graph.

* * * * *